Figures 1, 2:
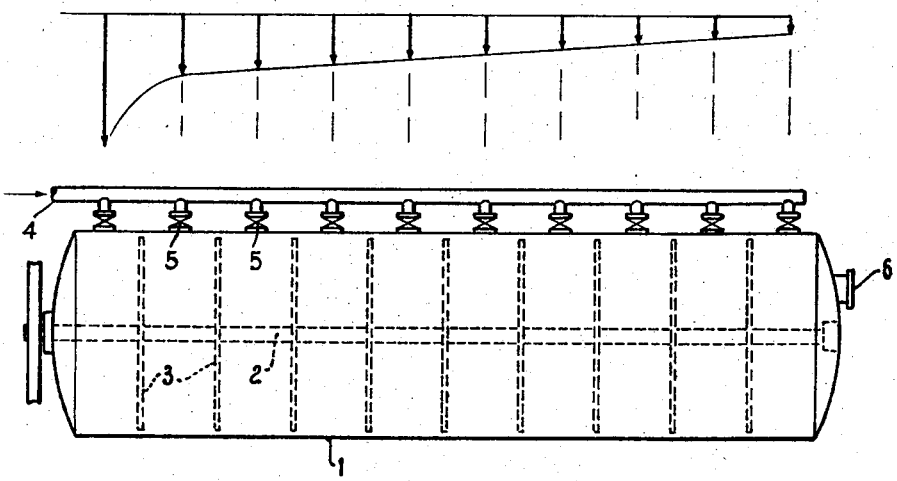

Sept. 25, 1951 L. VÁHL 2,569,357
PROCESS FOR CRYSTALLIZING SOLUTIONS
Filed June 1, 1948

Inventor
Laszlo Vahl
by [signature]
Atty.

Patented Sept. 25, 1951

2,569,357

UNITED STATES PATENT OFFICE 2,569,357

PROCESS FOR CRYSTALLIZING SOLUTIONS

László Vàhl, Muiderberg, Netherlands, assignor to Werkspoor N. V., Amsterdam, Netherlands, a company of the Netherlands Application June 1, 1948, Serial No. 30,395
In the Netherlands June 5, 1947

1 Claim. (Cl. 23—295)

For crystallizing solutions by cooling in continuous operation crystallizing troughs are used which are divided into compartments by stationary partitions or rotary discs, see e. g. Patent No. 1,868,406. In the first compartment of the trough preferably seed grains are added to the solution in a quantity corresponding to the number of crystals to be obtained. Said grains grow in the succeeding compartments to crystals of the desired size. For a uniform growth of the crystals it is required that the concentration of the solution to be crystallized decreases according to a definite rate as otherwise unallowable quantities of new crystals, so called false-grains are formed.

In order to prevent the formation of false-grains cooling is generally carried out very moderately so that the output of the crystallizer is materially reduced.

Tests have shown that the drawback of forming false-grains may considerably be reduced and the output for a given volume of the trough materially be increased by dividing the supply of the solution to be crystallized among the succeeding compartments. According to the invention the solution to be crystallized is supplied to the first compartment in a quantity which is smaller than half the total quantity to be supplied and the rest of the solution is divided over the other compartments in such a manner that each successive compartment receives less than the preceding compartment.

In the drawing, Fig. 1 is a diagrammatic side view in elevation of a suitable crystallizing apparatus for carrying out the process according to the invention and Fig. 2 is a graph illustrating the operation of the process.

Referring now to the drawing, specifically to Fig. 1, in the trough 1 a shaft 2 is rotatably mounted and carries discs 3 which may e. g. be formed as described in Patent No. 1,868,406. Above the trough a supply-conduit 4 for the solution to be crystallized is arranged and comprises for each compartment formed between adjacent discs 3 a branch having a control valve 5.

To the first compartment e. g. 30% of the total quantity of the solution is supplied as indicated by the arrow $a$ in Fig. 2. To the second compartment 15% is supplied as indicated by the arrow $b$ and the rest is divided among the succeeding compartments as indicated by the successively shorter arrows. As the discs are recessed, e. g. sector shaped, the solution continually flows from each compartment to the next and is continuously discharged at 6.

What I claim is:

In a process for crystallizing solids from a solution thereof which comprises continuously flowing through a successive series of cooling zones the crystallizing solution, supplying to the first of said zones a quantity of the solution that is less than half the total quantity of the solution to be crystallized, supplying to each successive zone in diminishing quantity a portion of the remainder of the total quantity of said solution, crystallizing the solid from the solution in the succeeding zones, and withdrawing the crystallized solution only from the last zone.

LÁSZLÓ VÀHL.

REFERENCES CITED

The following references are of record in the file of this patent:

UNITED STATES PATENTS

| Number | Name | Date |
|---|---|---|
| 1,868406 | Bonath | July 19, 1932 |

FOREIGN PATENTS

| Number | Country | Date |
|---|---|---|
| 390,032 | Germany | Jan. 23, 1920 |
| 401,160 | Germany | Aug. 29, 1924 |